April 14, 1925.
W. V. NICKAU
VALVE FACING DEVICE
Filed Oct. 31, 1921
1,533,133
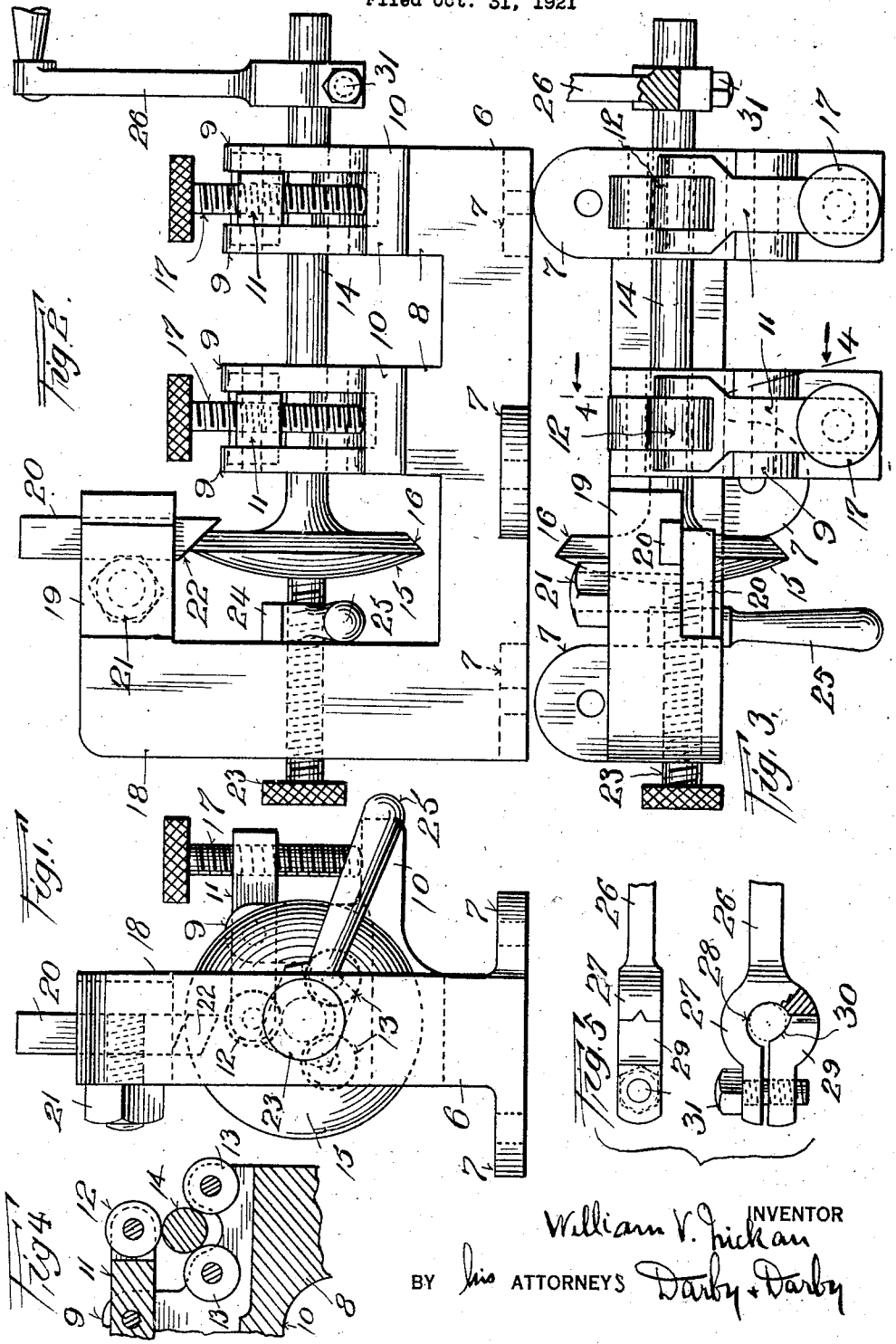

Patented Apr. 14, 1925.

1,533,133

UNITED STATES PATENT OFFICE.

WILLIAM VICTOR NICKAU, OF RAHWAY, NEW JERSEY.

VALVE-FACING DEVICE.

Application filed October 31, 1921. Serial No. 511,712.

*To all whom it may concern:*

Be it known that I, WILLIAM V. NICKAU, a citizen of the United States, residing at Rahway, county of Union, State of New Jersey, have made a certain new and useful Invention in Valve-Facing Devices, of which the following is a specification.

This invention relates to valve facing devices.

The object of the invention is to provide a device which is simple in structure and efficient in operation for facing valve seating surfaces.

A further object of the invention is to provide a device of the nature referred to wherein the valve is efficiently supported and held in position with relation to a facing tool whereby the seating surface of the valve may be quickly, easily and effectively faced or refaced.

The invention consists substantially in the construction, combination, location, and relative arrangement of parts, all as will be more fully hereinafter set forth, as shown in the accompanying drawing, and finally pointed out in the appended claims.

Referring to the accompanying drawing—

Fig. 1 is a view in end elevation of a valve facing device embodying the principles of my invention.

Fig. 2 is a view in side elevation of the same.

Fig. 3 is a top plan view.

Fig. 4 is a broken detail view in section on the line 4—4, Fig. 3, looking in the direction of the arrows.

Fig. 5 is a broken detail view respectively in plan and edge elevation, parts being broken out, showing the manner of applying the valve turning handle to the valve stem.

In the manufacture of valves for engines, it is necessary to turn or face off the seating surface of the valve so as to afford an efficient seating surface therefor. It also frequently happens that the seating surface of the valve becomes pitted from the heat to which the valve in operation is subjected, particularly in the case of valves employed in automobile and other internal combustion engines, and, moreover, carbon deposits take place upon the valve seating surface. When the valve seating surface becomes pitted by heat or otherwise, or becomes covered with carbon or other deposits or particles thereof, the valve fails to seat properly in a tight fitting manner, with the result that it fails to accomplish efficiently its valve function, resulting in loss of compression in the cylinder, and hence loss of power of the engine.

It is among the special purposes of my present invention to provide a device which is simple in structure, efficient in operation, and economical to manufacture, whereby the seating surface of a valve may be quickly, easily and readily faced or refaced.

It is further among the special objects and purposes of my invention to provide a device of the nature referred to which may be readily employed as a tool capable of being secured or held upon a bench, or other suitable support, and in which the valve may be carried and supported in proper relation so that its seating surface is held and maintained in proper position and relation with reference to a facing tool, whereby, by suitably rotating the tool, or the valve, such seating surface may be quickly and easily surfaced or refaced as required.

I have found that excellent results are obtained by supporting the valve by means of its stem upon roller bearings whereby the valve may be rotated axially with respect to its stem, and its seating surface maintained in proper relation to an edge tool, whereby, by rotating the valve stem the surfacing or refacing of the valve seating surface is effected. I have also found it desirable to support the valve stem on its roller bearings at separated points with reference to the length of the stem, and in definite relation of the axis of the valve stem with reference to the angle of the cutting edge of the facing tool.

In the accompanying drawing I have shown a structure embodying the principles of my invention, and a form thereof which I have found to be practical, economical to manufacture, simple in structure, efficient in operation, and wherein 6 designates a suitable frame adapted to be secured by the lugs 7 to a work bench or other suitable or convenient support. The frame is formed with vertical standards 8, suitably spaced apart from each other, and each formed with upwardly extending forked bracket arms 9, and also a laterally extending portion 10. Upon the bracket arms 9 are pivotally mounted levers 11, each carrying a roller 12 at its inner end. Each roller 12 cooperates with a pair of spaced apart rollers 13, see Figs. 1 and 4, to form a roller bearing support, upon which is received the stem 14 of the valve 15, the seating surface 16 of which is to be faced or surfaced. A set screw 17 is tapped through the outer end of each lever 11, and the end of said screw impinges against or engages the extension 10 of the standard 8, thereby affording means by which the roller 12 may be raised from clamping relation with respect to the valve stem 14 when the latter is in position upon the rollers 13, or, when desired, the lever 11 may be rocked to carry the roller 12 into clamping engagement with respect to the valve stem. The arrangement thus described affords a convenient method for placing the valve stem in position or removing it and the valve when the refacing operations have been completed. By employing two sets of supporting rollers arranged as above described, the sets of rollers being spaced apart from each other, I am enabled to accurately support the valve stem in true relation for the axis thereof to be maintained in proper relation for the seating surface 16 of the valve to be accurately surfaced or refaced by a suitable tool. The end standard 18 of the frame is formed with an overhanging portion 19, see Figs. 2 and 3, disposed to overhang the valve 15 when the stem of the latter has been mounted and suitably clamped in the roller bearings referred to. Mounted in the overhanging portion 19 of the frame is the facing tool 20, which may be clamped into position therein in any suitable or convenient manner, as, for instance, by means of the clamp bolt 21. The cutting edge 22 of the tool 20 is on a bias or inclined surface coeresponding to the inclination of the seating surface 16 of the valve, so that by shifting the valve stem through the bearings afforded by the roller supports the inclined surface 16 of the valve may be advanced against the inclined edge 22 of the facing cutter. The provision of roller bearing supports for the valve stem permits the longitudinal displacement of the valve stem therethrough without disturbing the supports for the valve stem and without deranging the alignment thereof. The valve may be adjusted with relation to the cutting tool in any suitable or convenient manner. I have shown a simple arrangement for this purpose consisting of a set screw 23 tapped through the vertical end portion 18 of the frame and adapted to abut against the center of the valve 15. By turning up on this adjusting screw the valve and its stem may be shifted in the direction of the length of the stem, the latter sliding freely through its roller bearing supports. If desired, the adjusting screw 23 may be locked in its adjusted position to maintain the seating surface 16 of the valve in proper relation to the cutting edge of the tool 20. I have shown for this purpose a lock nut 24 which is provided with a handle 25 arranged to extend laterally from the frame in position to be easily clamped and held or turned to position to form a lock nut for the screw 23.

I have hereinbefore suggested that the facing operation is accomplished by rotatively moving the valve and the cutting tool 20 with relation to each other. In the form of my invention shown for illustrating the principles thereof, but to which my invention is not to be limited or restricted, I propose to axially rotate the valve stem, thereby rotating the valve. To accomplish this result I employ a detachable handle 26 adapted to be detachably applied to the valve stem. For this purpose I provide the handle 26 with a head portion 27 having a circular socket 28, see Fig. 5, adapted to receive the stem of the valve. Applied to the head portion 27 is a removable block 29 having a circular bearing surface corner or portion 30 which is designed to engage the surface of the valve stem and clamp the same into the socket 28 of the head 27. A set screw 31 may serve the purpose of clamping the block 29 to the head 27. In this manner the handle 26 is detachably applied to the stem 14 of the valve, and the provision of the block 29, as above described, enables the clamp to be applied to valve stems of varying sizes. By clamping the arm 26 upon the stem of the valve, said stem may be axially rotated within its roller bearing supports, thereby accomplishing the surfacing or refacing of the valve seating surface 16 through the action thereon of the edge of the cutting tool, as will be readily understood.

Many variations and changes in details in structure will readily occur to those skilled in the art and still fall within the spirit and scope of my invention.

Having now set forth the objects and nature of my invention, and a structure embodying the principles thereof, what I claim as new and useful and of my own invention, and desire to secure by Letters Patent, is,—

1. In a valve facing device, a frame having thereon forked extensions, a lever arm pivotally mounted in said extensions, a valve holder mounted within said frame and including a plurality of rollers between which the stem of the valve is held for axial rotation, one of said rollers being mounted on said lever arm, and means for adjusting said arm in combination with a facing tool mounted in the frame, and means to axially rotate the valve stem and valve within said roller support.

2. In a valve facing device, a frame, and a valve support mounted therein and including a pair of rollers between which the stem of the valve is held for axial rotation, a lever arm on which one of said rollers is adjustably held, a set screw extending through said lever arm, an extension on said frame against which said set screw impinges to adjust the roller, in combination with a facing tool mounted in the frame, means to axially rotate the valve stem and valve within said roller support, and means to adjust the valve and its stem longitudinally through said roller support.

3. In a valve facing device, a frame having lateral and forked extensions, lever arms in said forked extensions, and means in said lever arms to bear against said lateral extensions, a valve support mounted within said frame and including a pair of fixed rollers and an adjustable roller on said arms cooperating with said fixed rollers to clamp the valve stem between which the stem of the valve is held for axial rotation, in combination with a facing tool having an inclined cutting edge to act upon the surface of the valve to be faced, said tool fixedly mounted in the frame, and means to axially rotate the valve stem and valve within its roller bearing support.

4. In a valve facing device, a frame, a plurality of rollers mounted therein, the stem of the valve to be faced adapted to be received by and supported between said rollers, a pivotally mounted lever arm on which one of said rollers is movably held for adjustment towards and from the others, a set screw on the free end of said lever arm for adjusting said roller, a facing cutter carried by the frame, and a handle adapted to be detachably applied to the valve stem to axially rotate the same in said roller bearing.

5. In a valve facing device, a frame, a standard carried thereby, a lever pivotally mounted on said standard and carrying a roller, a pair of cooperating rollers mounted in said standard, said several rollers forming a roller bearing support adapted to receive and support the stem of a valve for axial rotation therein, in combination with a facing cutter mounted in the frame, and means to axially rotate the valve stem.

6. In a valve facing device, a frame, a standard carried thereby, a lever pivotally mounted on said standard and carrying a roller, a pair of cooperating rollers mounted in said standard, said several rollers forming a roller bearing support adapted to receive and support the stem of a valve for axial rotation therein, and a facing cutter mounted in said frame, in combination with an adjusting screw mounted in the frame to engage the head of the valve to shift the valve towards the facing cutter and to move the valve stem through its bearing support, and means to axially rotate the valve stem and cutter.

In testimony whereof I have hereunto set my hand on this 24th day of October A. D., 1921.

WILLIAM VICTOR NICKAU.